Patented June 5, 1951

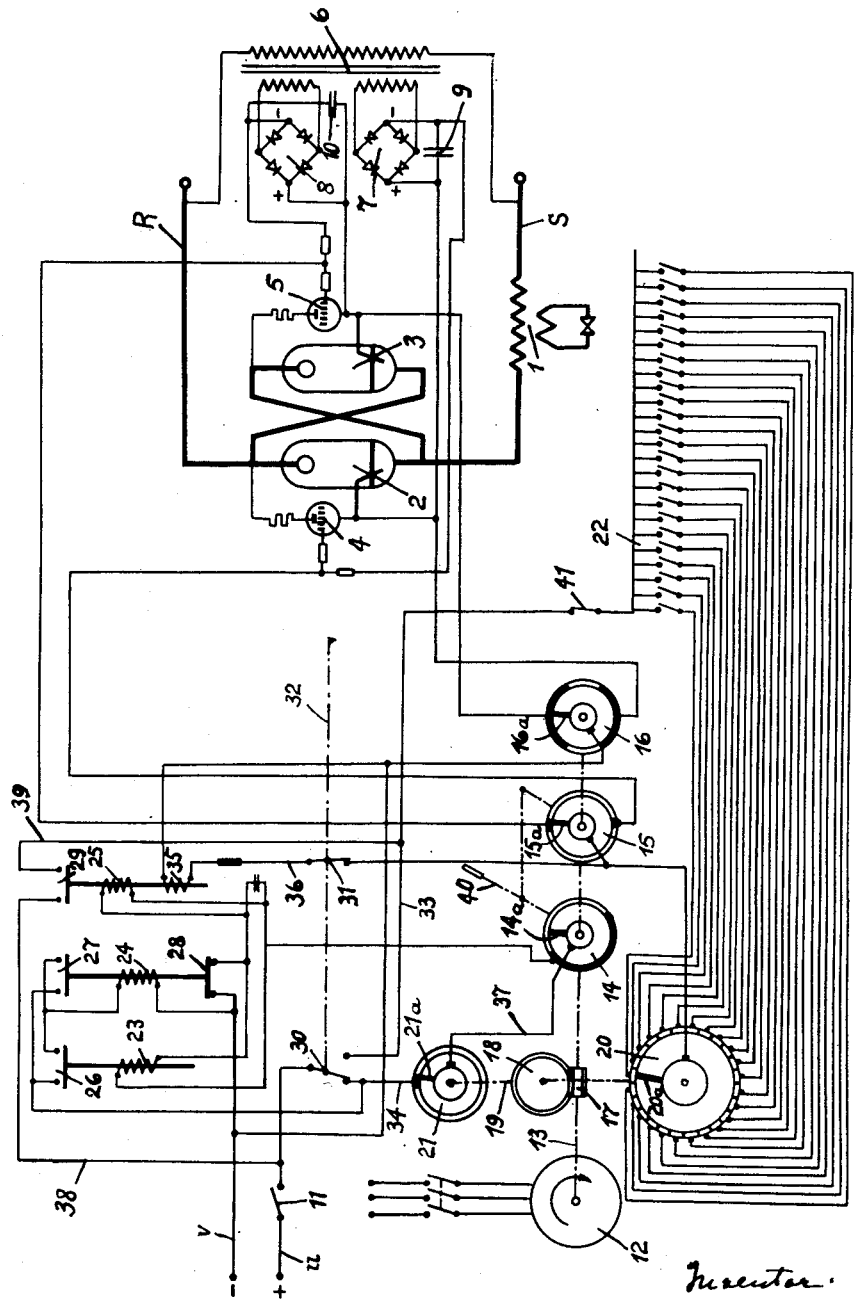

2,555,418

UNITED STATES PATENT OFFICE 2,555,418

SYNCHRONOUS CONTROL DEVICE FOR ELECTRICAL WELDING MACHINES

Paul Opprecht, Turgi, Switzerland, assignor to H. A. Schlatter A. G., Zollikon-Zurich, Switzerland Application March 12, 1949, Serial No. 81,174
In Switzerland March 15, 1948

17 Claims. (Cl. 171—97)

The invention relates to the control of electric welding machines, both for seam welding and for spot welding, and concerns a control device as well as a process for its operation.

It is an object of my invention to provide a process for the control of a welding machine wherein the control of the welding current is automatically synchronised with the alternations of the current supplied by the mains which may be a single phase or three phase current. It is a further object of my invention to provide a process wherein the phase relationship of the welding current with respect to the alternations supplied by the mains can be varied within wide limits.

It is a further object of my invention to provide a process for carrying out a predetermined welding scheme for seam welding composed of half waves or groups of half waves of the supply current used for generating a welding current, alternating with half waves or groups of half waves of the supply current during which no welding current is generated.

It is a further object of my invention to provide a process for generating impulses of welding current for spot welding lasting accurately a predetermined period.

It is another object of my invention to provide a control device capable of carrying out the said process and wherein the synchronisation is effected by means of a mechanical distributor.

It is still another object of my invention to provide a control device which by means of a change-over switch can be readily adapted for operation with a seam welding machine or with a spot welding machine.

According to an aspect of my invention the control device for an electrical welding machine wherein the welding current supplied by each phase of the alternating current mains used is controlled by two parallel operating mono-anode ignitron valves having their anodes and cathodes cross-connected and each controlled by a triode the grid of which is in turn bias-controlled, is operated according to a process comprising the steps of keeping the grids of said triodes normally at a negative bias of a comparatively low voltage, whereby the passage of current through said mono-anode ignitron valves is blocked, and periodically applying an overriding positive voltage alternately to the grids of said triodes in phase with the alternating current supplied to said welding transformer, whereby the said mono-anode ignitron valves are rhythmically ignited, thus supplying current impulses to the said welding transformer.

According to another aspect of my invention a control device constructed and operated as set forth comprises a synchronous electric motor connected to the alternating current mains which directly drives the rotors of some commutators or rotary switches and through reduction gearing drives the rotors of other commutators or rotary switches connected into a direct current system in such a manner that the positive voltage thereof is alternately distributed in the desired phase relation by the said commutators to the grids of the said triodes whereby the said mono-anode ignitron valves are rhythmically ignited, thus supplying current impulses to the said welding transformer.

With these general statements of the objects and purposes of my invention I will now proceed to describe an embodiment thereof and the manner in which my invention is carried out, and it will be understood that while I will describe what may be considered as a preferable embodiment of my invention, I do not limit myself to the precise conditions and proportions hereinafter set forth, as they may be varied by those skilled in the art in accordance with the particular purposes for which they are intended, and the conditions under which they are to be utilised.

In the accompanying drawing such a preferable embodiment of a synchronous control device having a mechanical distributor, for electric spot- or seam-welding machines is diagrammatically shown by way of example.

The welding transformer is denoted 1, the primary winding of which is connected to alternating or three phase mains by means of the conductors R and S, two ignitor-rod controlled mono-anode valves 2 and 3 being oppositely arranged in parallel in the conductor R for the rhythmic switching-on and -off of the welding transformer 1, which valves are in turn controlled by two triodes 4 and 5 shunted with respect to them. The grids of the triodes 4 and 5 are controlled by direct current and block the passage of current when they are under a negative voltage bias. When the grids of the triodes 4 and 5 receive a positive voltage, a current flows through these triodes 4 and 5 which causes the immediate ignition of the associated mono-anode valves 2 or 3. In order to achieve a safe blocking of the triodes 4 and 5 care must be taken that their grids are permanently biased by a negative voltage which is superseded by an overriding positive voltage in the moment only when the associated mono-anode valve 2 or 3 is to be ignited.

This permanent negative bias of the grids of the triodes 4 and 5 is produced in the following manner: the primary winding of the welding transformer 1 shunted by the primary winding of an auxiliary transformer 6 the secondary winding of which is subdivided into two parts, each of which feeds a rectifier 7 and 8, respectively. The negative poles of these rectifiers 7 and 8, respectively, are connected to the grids of the triodes 4 and 5, respectively, whereas the positive poles thereof are connected to the cathodes of the triodes 4 and 5, respectively. Each rectifier 7 and 8 is provided with a smoothing condenser 9 and 10, respectively. The two rectifiers 7 and 8 supply direct current of a voltage of 30 volts for example.

The synchronous control device with mechanical distributor operates with direct current of a substantially higher voltage than that of the direct current supplied by the rectifiers 7 and 8. This direct current of a voltage of for example 100 volts is supplied by a rectifier (not shown in the drawing) connected to the alternating or three phase mains, a conductor $u$ being connected to the positive pole, and a conductor $v$ to the negative pole of said transformer. In the conductor $u$ the master switch 11 of the welding machine is arranged which is advantageously designed as a foot operated switch or as a push button switch.

The mechanical distributor of the synchronous control device is designed as follows: a synchronous motor 12 is connected to the alternating current or three phase current mains, which motor has a speed of 3000 revolutions per minute and directly drives a shaft 13. On this shaft 13 are arranged the rotors 14$a$, 15$a$ and 16$a$ of three commutators 14, 15 and 16. Moreover a worm 17 is arranged on the shaft 13 which meshes with a worm wheel 18 which is rigidly wedged on a shaft 19. On this shaft 19 there are arranged the revolving brush 20$a$ of a commutator 20 and the rotor 21$a$ of a further commutator 21. The stator of the commutator 20 has twenty-four laminations each of which is connected to one of the twenty-four movable contact pieces of a multiple switch 22, the stationary contact pieces of which are connected to a single conductor. The transmission ratio between the worm 17 and the worm wheel 18 is chosen 12:1 so that the revolving brush 20$a$ of the commutator 20 and the rotor 21$a$ of the commutator 21 arranged on the shaft 19 revolve at 250 revolutions per minute. Hence follows that upon half a revolution of the shaft 13, i. e. in .01 sec., the brush 20$a$ moves-on one lamination of the stator of the commutator 20. Had another number of laminations been provided on the stator of the commutator 20, a different transmission ratio between the worm 17 and the worm wheel 18 would have had to be selected accordingly.

The synchronous control device shown comprises moreover three relays 23, 24 and 25, the first one of which serves a switch 26, the second one the switches 27 and 28, and the third one the switch 29.

By means of this synchronous control device it is possible to control seam welding as well as spot welding. However, since in the one or in the other case not all the components of this synchronous control device are in operation, and the circuit of the controlling direct current is different in both cases, a change over-switch is provided in the synchronous control device described, consisting of two switches 30 and 31 which are coupled with one another and have a common switch handle 32.

The operation of this synchronous control device with mechanical distributor is as follows:

1. Seam welding

By means of the switch handle 32 the change over-switch is brought into that position wherein the switch 30 connects the conductor $u$ with a conductor 33 to which the twenty-four stationary contact pieces of the multiple switch 22 are connected, while the switch 31 is open. By means of the twenty-four switches of the multiple switch 22 the scheme is adjusted according to which the seam welding is to be carried out. Each closed switch of this multiple switch 22 corresponds in the welding scheme to a half wave of current, and each opened switch corresponds to a half wave interval. When the seam welding is for example to be carried out according to a scheme of two half waves of welding and four half waves interval of the welding, the first two switches of the multiple switch 22 are to be closed, the subsequent four opened, then again two closed and so forth. Provided of course, that the number of laminations of the commutator 20 and accordingly the number of switches of the multiple switch 22 are a whole-number-multiple of the number of welding- and interval-waves of the welding scheme. The welding transformer 1 and the auxiliary transformer 6, the synchronous motor 12 and the rectifier, to which the conductors $u$ and $v$ are connected, are switched on. When closing the master switch 11, those laminations of the commutator 20 of which the associated switches on the multiple switch 22 are closed, receive a positive voltage which is taken-up by the revolving brush 20$a$ and transmitted to a lamination connected therewith of the rotor 15$a$ of the commutator 15. The stator of this commutator 15 has two oppositely arranged brushes one of which is connected to the grid of the triode 4, and the other to the grid of the triode 5. When the current carrying lamination of the rotor 15$a$ comes into contact with a brush of this commutator 15, the grid of the triode 4 or 5 connected thereto is biased by a positive voltage impulse. In the same rhythm the cathodes of the two triodes 4 and 5 which are connected with one of the two opposite brushes of the commutator 16 receive alternately a negative voltage via a lamination of the rotor 16$a$ of this commutator 16 connected to the conductor $v$. The occurrence of a positive voltage bias on the grids of the triodes 4 and 5 results any time in the immediate ignition of the mono-anode valves 2 or 3 controlled by the respective triode. When the rotor 15$a$ of the commutator 15 has turned 180°, the revolving brush 20$a$ of the commutator 20 has moved on to the next lamination of the stator of the latter and, when now this lamination is also carrying current, the grids of the other triode 4 or 5 is positively biased in a similar way, and the mono-anode valve controlled by this triode is ignited. When, however, the revolving brush 20$a$ comes into contact with a lamination of the stator of the commutator 20 which is not carrying current, the grid of the triode 4 or 5 does not receive a positive bias, and the igniting of the mono-anode valve 2 or 3 does not take place. In this manner the welding scheme is carried out as pre-set by means of the multiple switch 22. As soon as the master switch 11 is opened, the welding is interrupted.

2. Spot welding

By means of the switch handle 32 the change over-switch is brought into that position wherein the switch 30 connects the conductor $u$ to a conductor 34 leading to a contact piece arranged on the stator of the commutator 21, and the switch 31 connects the conductor connecting the revolving brush 20a of the commutator 20 with a lamination of the rotor 15a of the commutator 15 to a conductor 36 connected to a holding coil 35 of the relay 25 which in turn is connected to the conductor $v$ carrying negative voltage. The multiple switch 22 serves here for adjusting the welding period. Each current carrying lamination of the commutator 20, i. e. each closed switch of the multiple switch 22, corresponds to a welding period of .01 sec. Since in the case represented the stator of the commutator 20 has twenty-four laminations, the maximum welding period attainable would amount to .24 sec. Since the relay 25 the function of which will be described later, has to be currentless for a certain period in order to be capable of falling back into the starting position, this maximum adjustable welding period of .24 sec. can not be completely utilised, and in practice the maximum welding period amounts in the embodiment illustrated to —2 to .22 sec. The desired welding period, e. g. .2 sec., is adjusted thereby that the switches of the multiple switch 22 establishing the connection to the first twenty laminations of the stator of the commutator 20 are closed, and the four last ones are opened. In the starting position i. e. when the master switch 11 is not operated and the direct current serving for the control is accordingly interrupted, the switches 26, 27 and 29 are opened, and the switch 28 is closed.

The welding transformer 1 and the auxiliary transformer 6, the synchronous motor 12 and the rectifier to which the conductors $u$ and $v$ are connected, are then switched on. If now the master switch 11 is closed, the following happens: immediately before the revolving brush 20a of the commutator 20 reaches the first lamination, the lamination of the rotor 21a of the commutator 21 comes into contact with a brush conveniently arranged on its stator, which brush is connected via the conductor 34 and the switch 30 with the conductor $u$ carrying positive voltage. A lamination of the rotor 21a revolving at 250 R. P. M. is connected to a lamination of the rotor 14a revolving at 3000 R. P. M. of the commutator 14 by means of the conductor 37. As soon as this lamination of the rotor 14a reaches the brush of the commutator 14 that occupies half the circumference of the stator, the coils of the relays 23 and 25 are energised, and their circuit is closed via the switch 28 during half a revolution of the shaft 13, i. e. for the period of .01 sec. These relays 23 and 25 accordingly respond and close the switches 26 and 29. The first twenty laminations of the stator of the commutator 20 receive voltage via a conductor 38, the switch 29, and a conductor 39 connected to the conductor 33 and the closed switches of the multiple switch 22. By the closing of the switch 26 upon energising the relay 23 the coil of the relay 24 receives current, and this relay 24 responds in turn, whereby the switch 27 is closed and the switch 28 is opened, which has the consequence that the circuit of the coil of the relay 23 is interrupted so that this relay 23 drops off. However the relay 24 remains in its attitude since by the closing of the switch 27 the circuit of its coil remains closed. The circuit of the coil of the relay 25, too, is interrupted simultaneously with the relay 23. Now the revolving brush 20a has in the meantime reached the first lamination of the stator of the commutator 20 whereby the circuit of the holding coil 35 is closed so that accordingly this relay 25 remains in its attitude viz. during the whole welding period. Now positive voltage impulses are transmitted via the brushes of the commutator 15 alternately to the grids of the two triodes 4 and 5, while the cathodes thereof are connected to the conductor $v$ via the two brushes of the commutator 16. As soon as the grid of the triode 4 or 5 at any time receives a positive bias, the mono-anode valve 2 or 3 controlled by the respective triode 4 or 5 is ignited which results in the initiation of the welding process. After the termination of the welding period adjusted by means of the switches of the multiple switch 22, i. e. when the revolving brush 20a reaches the currentless twenty-first lamination of the stator of the commutator, the circuit of the holding coil 35 is interrupted and the relay 25 drops off, back into its starting position, whereby the switch 29 is again opened. Thereby it is prevented that, when the revolving brush 20a of the commutator 20 reaches the current carrying laminations again for the next time, a new welding process is initiated. A new welding process is initiated only when the master switch 11 is operated again.

The welding period can be adjusted within close limits from .01 sec. to about $(n-4)\times.01$ sec., wherein $n$ denotes the number of laminations of the commutator 20. This is of great advantage particularly in the welding of light metal alloys where short and accurately kept welding periods are a basic condition for faultless performance of the welding.

The two brushes of the stator of the commutator 15 as well as the brush of the stator of the commutator 14 are adjustably arranged and coupled with one another in such a manner that they can be adjusted at any time by a common lever 40 within a range of approximately 120° about equal angles. The two brushes of the commutator 15 are accordingly so designed, that they extend over about 120°. This allows electrically to shift the phase position of the igniting moment of the mono-anode valves 2 and 3 likewise about approximately 120°.

In the conductor 33 a control switch 41 may be arranged before the multiple switch 22 which is influenced by a cooling device (not shown in the drawing) of the mono-anode valves 2 and 3 in such a manner that it interrupts the conductor 33, and consequently sets the machine out of operation when the cooling of the mono-anode valves 2 and 3 fails.

In order to prevent any wrong adjustment of the multiple switch 22 the latter is conveniently designed as a roller type switch which is so constructed that any desired welding scheme can be adjusted merely by turning the roller.

I wish it to be understood that I do not desire to be limited to the exact details of construction shown and described, for obvious modifications will occur to persons skilled in the art.

What I claim as my invention and desire to secure by Letters Patent is:

1. A synchronous control device for electrical welding machines comprising a synchronous electric motor adapted to be connected to the alternating current supply means, a connection to a comparatively low voltage direct current source, a connection to a comparatively high voltage direct current source, and for each phase of the said alternating current supply mains used: two mono-anode ignitron valves having their anodes and cathodes cross-connected; two triodes each having its anode connected to the anode of one of the said ignitron valves, its cathode connected to the ignitor thereof and to the positive pole of the said low voltage direct current source, and its grid connected to the negative pole thereof; a welding transformer having a primary winding adapted to be connected to the said alternating current supply mains in series with the said two cross-connected ignitron valves, and a secondary winding adapted to supply the welding current; a reduction gearing adapted to be driven by the said electric motor; a first and a second commutator each having a stator, and a rotor having a lamination and adapted to be driven by said electric motor; a third commutator having a stator, a number of insulated laminations on said stator, and a rotary brush adapted to be driven by the said reduction gearing and to contact the said laminations in succession, two opposite brushes arranged on the stator of the said first commutator and each connected to the grid of one of the said triodes; two opposite brushes arranged on the stator of the said second commutator and each connected to the cathode of one of the said triodes; a multiple switch consisting of a plurality of individual switches, a common conductor connecting the one contact pieces of said individual switches with one another and adapted to be connected to the positive pole of said comparatively high voltage direct current source, a master switch arranged in said common conductor; the other contact pieces of said individual switches being connected each to a lamination of the said third commutator, the revolving brush of the said third commutator being connected to the lamination of the rotor of the said first commutator; the lamination of the rotor of the said second commutator being adapted to be connected to the negative pole of the said comparatively high voltage direct current source; the ratio of the said reduction gearing and the number of laminations of the said third commutator being so chosen that for each half revolution of the said motor the brush of said third commutator moves-on one lamination whereby overriding positive voltage impulses are transmitted via said first commutator alternately to the grids of the said two triodes resulting in igniting the associated ignitron valve in phase with the alternating current supplied to it by the mains.

2. A synchronous control device as claimed in claim 1 comprising a pair of opposite brushes arranged on the said first commutator angularly adjustable with respect to the rotor thereof so as to adjust the phase position of ignition of the said ignitron valves.

3. A synchronous control device as set forth in claim 2 in which the said brushes of the second commutator each occupy substantially one third of the circumference of the stator.

4. A synchronous control device for electrical welding machines comprising a synchronous motor adapted to be connected to the alternating supply mains, a connection to a comparatively high voltage direct current source, and for each phase of the alternating current supply mains used: two mono-anode ignitron valves having their anodes and cathodes cross connected; a welding transformer having a primary winding adapted to be connected to the alternating current mains in series with the said cross-connected ignitron valves and a secondary winding adapted to supply the welding current; an auxiliary transformer having a primary winding shunted across the said ignitron valves and primary winding of said welding transformer, and two secondary windings; two rectifiers each connected with one of the secondary windings of said auxiliary transformer and constituting a comparatively low voltage direct current source; two triodes each having its anode connected to the anode of one of the said ignitron valves, its cathode connected to the ignitor thereof and to the positive pole of one of the said rectifiers, and its grid to the negative pole thereof, a reduction gearing adapted to be driven by the said electric motor; a first and a second commutator each having a stator, and a rotor having a lamination and adapted to be driven by said electric motor; a third commutator having a stator, a number of insulated laminations on said stator, and a rotary brush adapted to be driven by the said reduction gearing and to contact the said laminations in succession, two opposite brushes arranged on the stator of the said first commutator and each connected to the grid of one of the said triodes; two opposite brushes arranged on the stator of the said second commutator and each connected to the cathode of one of the said triodes; a multiple switch consisting of a plurality of individual switches, a common conductor connecting the one contact pieces of said individual switches with one another and adapted to be connected to the positive pole of said comparatively high voltage direct current source, a master switch arranged in said common conductor; the other contact pieces of said individual switches being connected each to a lamination of the said third commutator, the revolving brush of the said third commutator being connected to the lamination of the rotor of the said first commutator; the lamination of the rotor of the said second commutator being adapted to be connected to the negative pole of the said comparatively high voltage direct current source; the ratio of the said reduction gearing and the number of laminations of the said third commutator being so chosen that for each half revolution of the said motor the brush of said third commutator moves-on one lamination whereby overriding positive voltage impulses are transmitted via said first commutator alternately to the grids of the said two triodes resulting in igniting the associated ignitron valve in phase with the alternating current supplied to it by the mains.

5. A synchronous control device as claimed in claim 4 comprising two smoothing condensers each shunted across one of the said rectifiers.

6. A synchronous control device including in addition to the combination claimed in claim 1: a change-over switch device comprising one switch connected through the said master switch with the positive pole of the said high voltage direct current source and having two alternative closed positions, a second switch in the connection of the negative pole of said high voltage direct current source to the rotor of the said first commutator and to the rotary brush of said third commutator, having an open and a closed position, and a common control handle adapted to operate both the said switches of the said change-over switch device simultaneously; a fourth commutator comprising a rotor having a lamination and adapted to be driven by the said reduction gearing and a stationary brush adapted to be connected by the first mentioned switch of said change-over switch device to the positive pole of said high voltage direct current source; a fifth commutator comprising a rotor having a lamination and adapted to be driven by the said motor, and a stationary brush; a first and a second relay each having a contact normally open and a coil, a third relay having a contact normally open, another contact normally closed and a coil, the coils of the said first and second relays being in parallel and connected on the one hand through the said fifth and fourth commutators and the master switch to the positive pole of said high voltage direct current source and on the other hand through the normally closed contact of said third relay to the negative pole of said high voltage direct current source, and the coil of said third relay being connected on the one hand to the said negative pole and on the other hand to the normally open contact of its own relay and to the normally open contact of the said first relay, these two contacts being in parallel with one another and connected to the brush of said fourth commutator; and a holding coil on the said second relay connected on the one hand to the negative pole of said high voltage direct current source and on the other hand adapted to be connected to the rotary brush of the said third commutator via the second switch of the said change-over switch device.

7. A synchronous control device as claimed in claim 1 comprising a heat-sensitive switching device responsive to the temperature of the said ignitron valves and adapted to switch off the overriding positive voltage supply to the said triodes when the said temperature exceeds a predetermined limit.

8. In combination, an alternating current seam welding circuit, an alternating current source, a welding transformer, two electrically controlled electronic devices of the unidirectional type interposed inversely between the primary of said transformer and the mains of said current source for controlling the flow of alternating current to said primary, control members for said electronic devices and a control circuit connected to said control members of the electronic devices and including a rotating current breaker device consisting of a collector having a plurality of lamellas and a brush, a synchronous electric motor connected to the mains and driving said current breaker device, a manually operable switch member for each of said lamellas of the collector connecting said lamellas individually to said control circuit.

9. The combination, as set forth in claim 8, which includes a common roller including means for actuating a predetermined number of said switch members in accordance with the position of said roller, in order to provide a plurality of combinations of closed circuits through said lamellas.

10. The combination, as set forth in claim 8, in which said collector has twenty-four lamellas of equal distance and width, said lamellas being equally distributed over the periphery of said collector.

11. The combination, as set forth in claim 8, in which said collector is in a fixed position and said brush is rotating.

12. The combination, as set forth in claim 8, in which said control circuit is supplied by a source of direct current.

13. The combination, as set forth in claim 8, which includes a gear between said synchronous motor and said current breaker device in order to determine the time of contact between each lamella and a brush of said current breaker device to one-half of a cycle of the main alternating current, and a rotating contact device, directly driven by said synchronous motor and connected in series to said current breaker device within said control circuit.

14. In combination, an alternating current welding device, adapted for seam as well as spot welding, an alternating current source, a welding transformer, two electrically controlled electronic devices of the unidirectional type interposed between the primary of said transformer and the mains of said current source for controlling the flow of alternating current to said primary, control members for said electronic devices and a control circuit connected to said control members of the electronic devices and including a rotating current breaker device consisting of a collector having a plurality of lamellas and a brush, a synchronous electric motor connected to the mains and driving said current breaker device, a manually operable switch member for each of said lamellas of the collector connecting said lamellas individually to said control circuit, a commanding contact and a commanding relay actuated by said commanding contact, a master switch closing the respective connections for "seam welding" and for "spot welding," a rotating contact member driven by said synchronous motor, a relay combination in connection with said rotating contact member, a commanding circuit including said commanding relay, said relay combination and said relay combination, the latter being adapted to hold said control circuit in closed position for one revolution of said rotating current breaker device after being actuated by said commanding relay, provided said master switch is brought in the position of "spot welding."

15. The device, as set forth in claim 14, in which said master switch shunts said relay combination upon bringing said master switch in the position of "seam welding."

16. The device, as set forth in claim 14, in which said commanding circuit is energized by a source of direct current.

17. A synchronous control device for electrical welding machines comprising a synchronous electric motor adapted to be connected to the alternating current supply means, a connection to a comparatively low voltage direct current source, a connection to a comparatively high voltage direct current source, and for each phase of the said alternating current supply mains used: two mono-anode ignition valves having their anodes and cathodes cross-connected; two triodes each having its anode connected to the anode of one of the said ignition valves, its cathode connected to the igniter thereof and to the positive pole of the said low voltage direct current source, and its grid connected to the negative pole thereof; a welding transformer having a primary winding adapted to be connected to the said alternating current supply mains in series with the said two cross connected ignitron valves, and a secondary winding adapted to supply the welding current; a reduction gearing adapted to be driven by the said electric motor; a communication having a stationary and a rotary element, a plurality of insulations on one of said elements, said rotating element driven by said reduction gearing and to have contacted the said laminations in succession, a first means to control the grids of the said triodes, a second means to control the cathode of the said triodes, a multiple switch consisting of a plurality of individual switches, a common conductor connecting the one contact pieces of said individual switches with one another and adapted to be connected to the positive pole of said comparatively high voltage direct current source, a master switch arranged in said common conductor; the other contact pieces of said individual switches being connected each to a lamination of the said commutator, the element not carrying the laminations of said commutator being connected to said first control means, the said second control means being connected to the negative pole of the said comparatively high voltage direct current source, the ratio of the said reduction gearing and the number of laminations of the said commutator being so chosen in predetermined manner in accordance with the number of poles of said electric motor that for each corresponding part revolution of the said motor the revolving element of said commutator moves-on one lamination whereby overriding positive voltage impulses are transmitted via said first control means alternately to the grids of the said two triodes resulting in igniting the associated ignitron valves in phase with the alternating current supplied to it by the mains.

PAUL OPPRECHT.

REFERENCES CITED

The following references are of record in the file of this patent:

UNITED STATES PATENTS

| Number | Name | Date |
|---|---|---|
| 2,260,039 | Levoy, Jr. | Oct. 21, 1941 |
| 2,264,175 | Dawson | Nov. 25, 1941 |
| 2,477,211 | Smith | July 26, 1949 |